(12) United States Patent
Lin et al.

(10) Patent No.: US 10,935,731 B2
(45) Date of Patent: Mar. 2, 2021

(54) FIBER OPTIC ADAPTER (71) Applicant: GLORIOLE ELECTROPTIC TECHNOLOGY CORP., Kaohsiung (TW)

(72) Inventors: Jim Lin, Kaohsiung (TW); Chia-Hua Wu, Kaohsiung (TW); Shu-Hui Hsu, Kaohsiung (TW)

(73) Assignee: Gloriole Electroptic Technology Corp., Kaohsiung (TW)

( * ) Notice: Subject to any disclaimer, the term of this patent is extended or adjusted under 35 U.S.C. 154(b) by 0 days.

(21) Appl. No.: 16/560,152

(22) Filed: Sep. 4, 2019

(65) Prior Publication Data
US 2020/0081193 A1  Mar. 12, 2020

(30) Foreign Application Priority Data

Sep. 11, 2018  (TW) .................. 10721237.5

(51) Int. Cl.
*G02B 6/38* (2006.01)

(52) U.S. Cl.
CPC ........... *G02B 6/3825* (2013.01); *G02B 6/387* (2013.01); *G02B 6/3831* (2013.01); *G02B 6/3893* (2013.01)

(58) Field of Classification Search
None
See application file for complete search history.

(56) References Cited

U.S. PATENT DOCUMENTS

2016/0266339 A1* 9/2016 Zhang .................. G02B 6/3885

* cited by examiner

*Primary Examiner* — Jerry Rahill
(74) *Attorney, Agent, or Firm* — Michael Best & Friedrich LLP (57) ABSTRACT

A fiber optic adapter includes an outer casing, two coupling members for removably engaging a ferrule end of a fiber optic connector and an auxiliary member for sleeving the ferrule end therein. The auxiliary member is operable to move relative to the coupling members between a locked position, where the coupling members are adapted to engage the ferrule end for preventing separation of the ferrule end from the fiber optic adapter, and an open position, where the auxiliary member moves the coupling members to disengage from the ferrule end, thereby allowing separation of the ferrule end from the fiber optic adapter.

14 Claims, 7 Drawing Sheets

FIBER OPTIC ADAPTER

CROSS-REFERENCE TO RELATED APPLICATION

This application claims priority of Taiwanese Patent Application No. 107212375, filed on Sep. 11, 2018.

FIELD

The disclosure relates to an adapter, and more particularly to a fiber optic adapter.

BACKGROUND

A Multi-Fiber Push On (NPO) connector is a type of optical connector adapted for supporting high-speed telecommunication and data transfer, and is operable to configure multiple optical fibers within its confined space.

Figure 1:
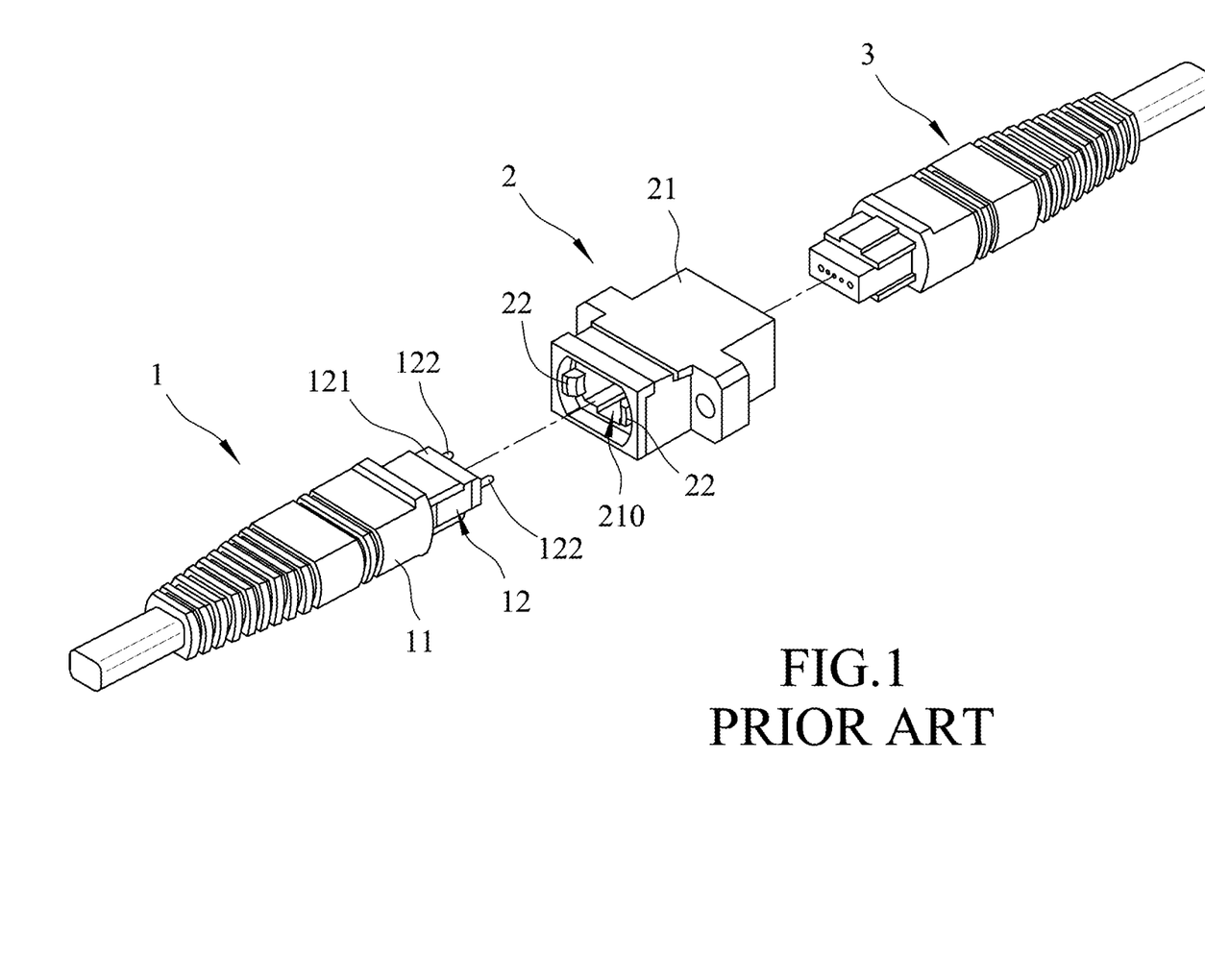
FIG. 1 is an exploded perspective view of a conventional fiber optic adapter, a male fiber optic connector and a female fiber optic connector.
Figure 2:
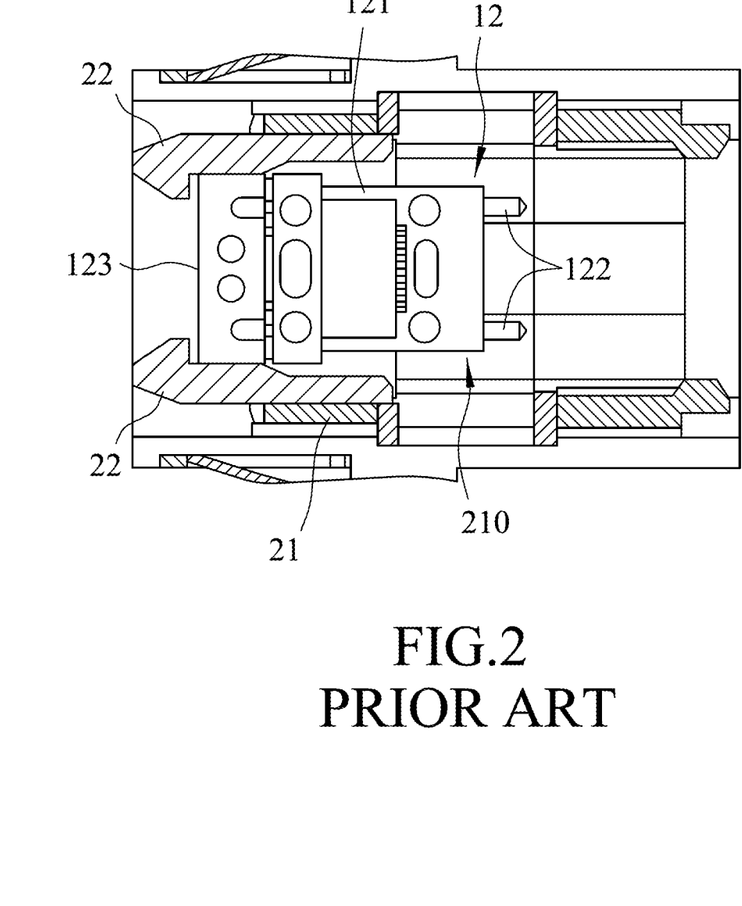
FIG. 2 is a top sectional view of the conventional fiber optic adapter and a ferrule end of the male fiber optic connector disposed therein.

Referring to FIGS. 1 and 2, a conventional MPO adapter 2 has two opposite ends that are respectively adapted for removably engaging male and female MPO connectors 1, 3. The male MPO connector 1 has a connecting body 11 and a ferrule end 12 that is mounted to an end of the connecting body 11. The ferrule end 12 includes an end body 121, two spaced-apart ferrule members 122 that extend from the end body 121, and a positioning member 123 that is mounted to the end body 121 for fixedly positioning the ferrule members 122 thereto. The conventional MPO adapter 2 has an outer casing 21 that is formed with a plug hole 210, and two spaced-apart blocking members 22 that are mounted to an inner surface of the outer casing 121 and that are disposed in the plug hole 210.

When the male MPO connector 1 is to be engaged to the conventional MPO adapter 2, the blocking members 22 are pushed by the ferrule end 12 of the male MPO connector 1 to move away from each other, such that the ferrule end 12 may extend past the blocking members 22 to be disposed in the plug hole 210. The ferrule end 12 is prevented from extending past the plug hole 210 when in use, as the other end of the plug hole 210 is usually occupied by the female MPG connector 3. When the ferrule end 12 is thoroughly disposed in the plug hole 210, the blocking members 22 return to their original positions while simultaneously hooking and abutting the positioning member 123 of the ferrule end 12, thereby preventing the ferrule end 12 from being easily disengaged.

To revert the process, the blocking members 22 are required to move away from each other again so the positioning member 123 of the ferrule end 12 is not hooked to the blocking members 22. However, since the ferrule end 12 and the blocking members 22 are all disposed in the plug hole 210, extra tools are needed to push the blocking members 22 away from each other so that the male MPG connector 1 may be disengaged from the conventional MPO adapter 2 without damaging the positioning member 123 and the blocking members 22.

SUMMARY

Therefore, an object of the disclosure is to provide a fiber optic adapter that can alleviate the drawback of the prior art.

According to the disclosure, the fiber optic adapter includes an outer casing, two coupling members, and an auxiliary member. The coupling members are mounted to the outer casing, are spaced apart from each other in a first direction, and are adapted for removably engaging a ferrule end of a fiber optic connector. The auxiliary member is adapted for sleeving the ferrule end therein, is removably coupled to the coupling members, and is operable to move in a front-rear direction transverse to the first direction relative to the coupling members between a locked position and an open position.

When the auxiliary member is at the locked position, the coupling members are adapted to engage the ferrule end for preventing separation of the ferrule end from the fiber optic adapter. When the auxiliary member is at the open position, it moves the coupling members to disengage from the ferrule end, thereby allowing separation of the ferrule end from the fiber optic adapter.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
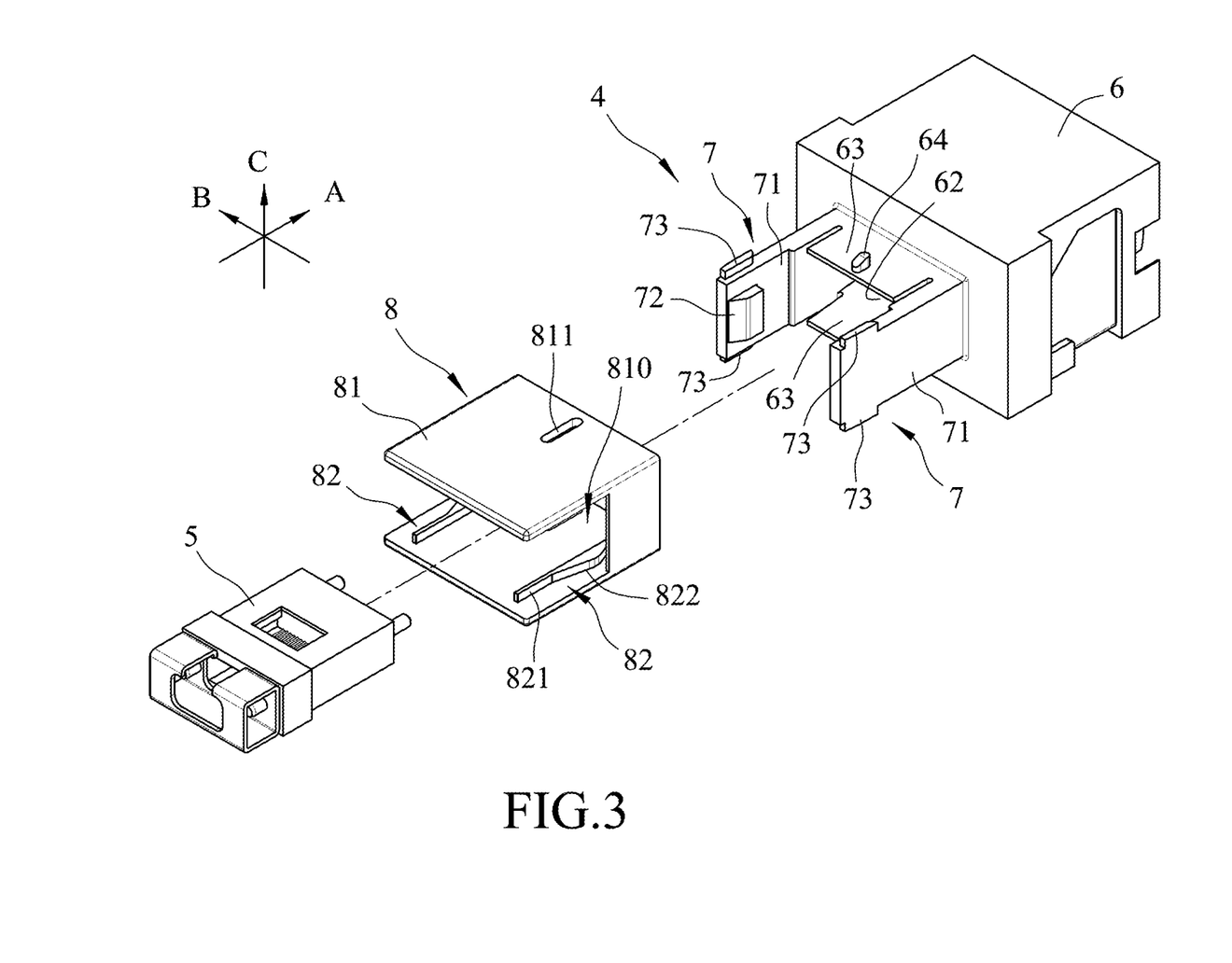
FIG. 3 is an exploded perspective view of an embodiment of a fiber optic adapter according to the disclosure with a ferrule end of a fiber optic connector.
Figure 5:
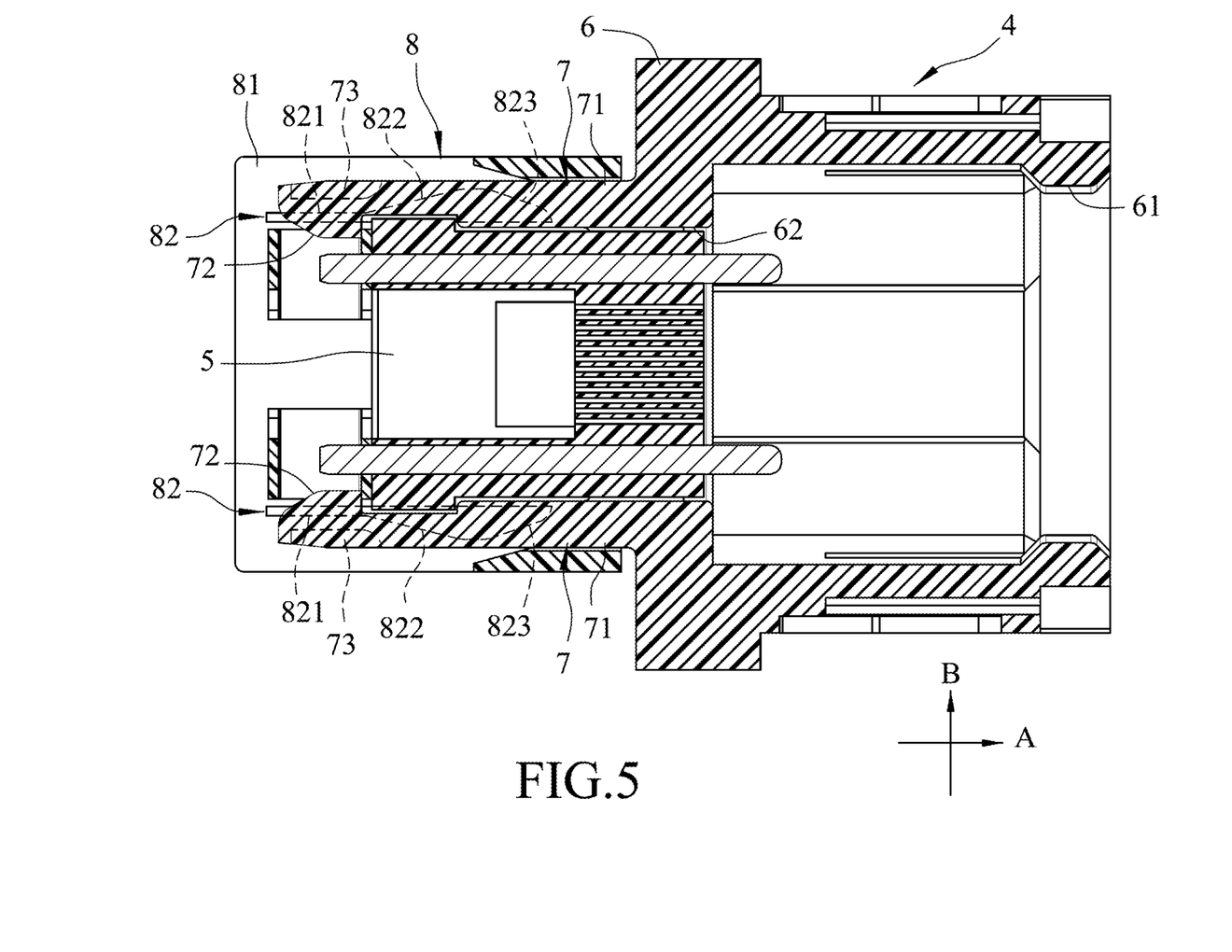
FIG. 5 is a top sectional view of the embodiment, illustrating the auxiliary member at the locked position.

Referring to FIGS. 3 and 5, an embodiment of a fiber optic adapter 4 according to the disclosure is adapted to be used alongside a ferrule end 5 of a MT ferrule fiber optic connector extending in a front-rear direction (A). In the embodiment, the fiber optic adapter 4 includes an outer casing 6, two coupling members 7 that extend in the front-rear direction (A) from a rear end of the outer casing 6 for removably engaging the ferrule end 5 and that are spaced apart from each other in a first direction (B) transverse to the front-rear direction (A), and an auxiliary member 8 that is adapted for sleeving the ferrule end 5 therein and that is removably coupled to the coupling members 7. The outer casing 6 includes front and rear openings 61, 62 that are spatially communicated with each other and that are spaced apart in the front-rear direction (A), two extending walls 63 that are spaced apart from each other in a second direction (C) transverse to both the front-rear direction (A) and the first direction (B) and that are disposed between the coupling members 7, and two positioning tongues 64 that protrude respectively and outwardly from the extending walls 63 in the second direction (C) (only one is shown in FIG. 3). Two MPO fiber optic connectors (not shown) are removably coupled in the outer casing 6 to be optically connected to each other, with the rear opening 62 being adapted for removably engaging the ferrule end 5 of one of the MPO fiber optic connector, and the front opening 61 being adapted for removably engaging an end of the other one of the MPO fiber optic connector.

Each of the coupling members 7 is flexible, is disposed on a respective one of the two opposite lateral sides of the rear opening 62, and includes an extended portion 71 that extends rearwardly from the outer casing 6, a hook portion 72 that extends from the extended portion 71 in the first direction (B) toward the other one of the coupling members 7, and two protruded portions 73 that protrude away from each other from the extended portion 71 in the second direction (C). The auxiliary member 8 includes a sleeving portion 81 that defines an inner space 810 for retaining the ferrule end 5 therein, four guiding portions 82 that are disposed in the inner space 810 and that protrude from an inner surface of the sleeving portion 81 (only two are shown in FIG. 3), and a blocking portion 83 (see FIG. 4) that protrudes inwardly from the sleeving portion 81 into the inner space 810. The sleeving portion Si is formed with two guiding grooves (811) (only one is shown in FIG. 3) that extend in the front-rear direction (A). When the auxiliary member 8 is coupled to the coupling members 7, the coupling members 7 are disposed in the inner space 810, and the positioning tongues 64 respectively extend into the guiding grooves 811 to be slidably engaged therewith. The guiding portions 82 are spaced apart in the first direction (B) and the second direction (C) to be respectively in contact with the protruded portions 73. Each of the guiding portions 82 has a positioning surface 821 that extends in the front-rear direction (A), a first guiding surface 822 that extends from the position surface 821 and that is inclined away from a space among the guiding portions 82 and toward the outer casing 6, and a second guiding surface 823 that extends from the first guiding surface 822 and that is inclined toward the space among the guiding portions 82 and toward the outer casing 6.

The auxiliary member 8 is operable to move in the front-rear direction (A) relative to the coupling members 7 between a locked position and an open position. When the auxiliary member 8 is at the locked position (FIG. 5), the protruded portions 73 respectively and closely abut against the positioning surfaces 821 of the guiding portions 82, such that the hook portions 72 are adapted to engage the ferrule end 5 for preventing separation of the ferrule end 5 from the fiber optic adapter 4. Specifically, When the auxiliary member 8 is at the locked position, the coupling members 7 are not deformed, and a distance between the hook portions 72 is smaller than a width of the ferrule end 5 in the first direction (B), thereby retaining the ferrule end 5 in front of the hook portions 72 and inside the inner space 810 of the sleeving portion 81.

Figure 4:
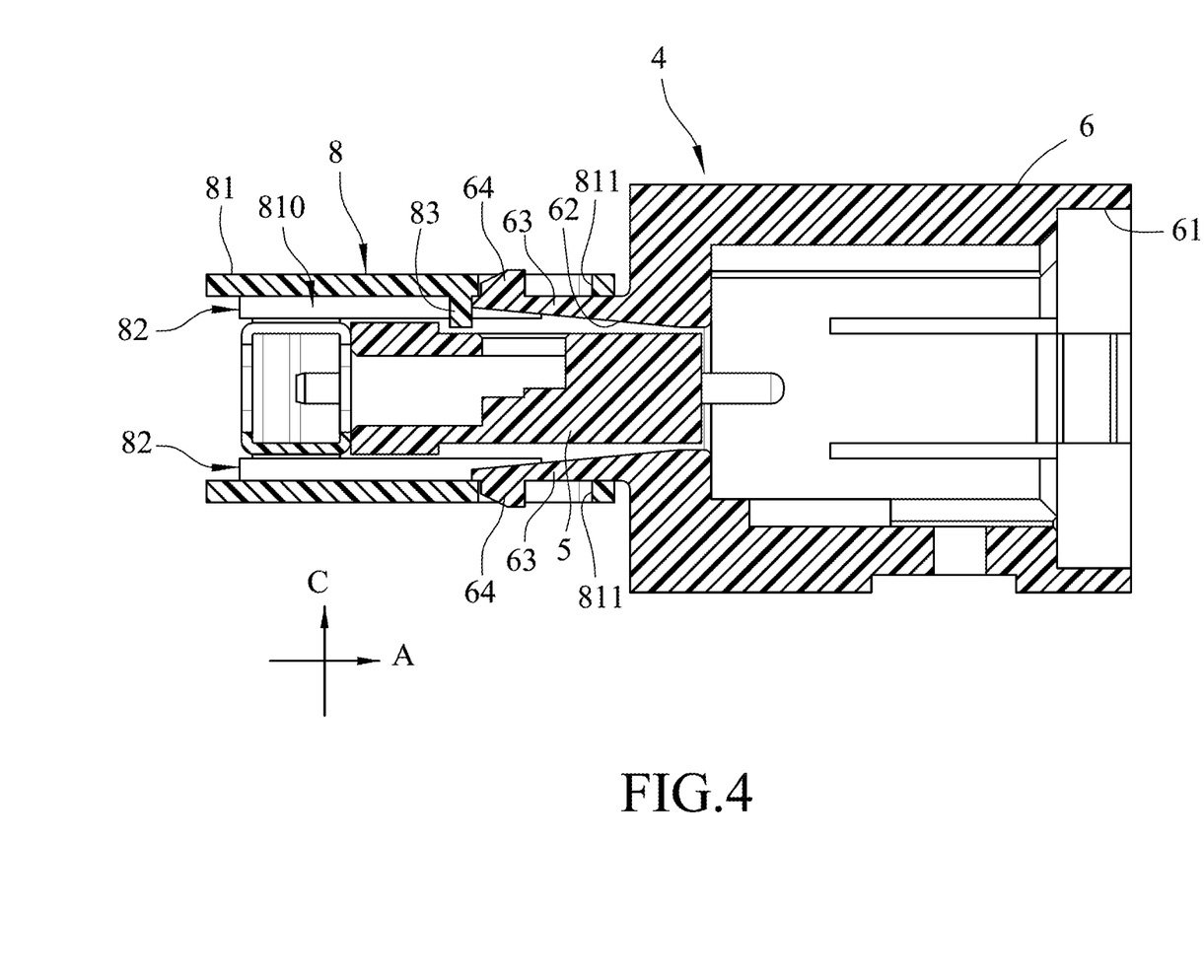
FIG. 4 is a side sectional view of the embodiment, illustrating an auxiliary member thereof at a locked position.
Figure 6:
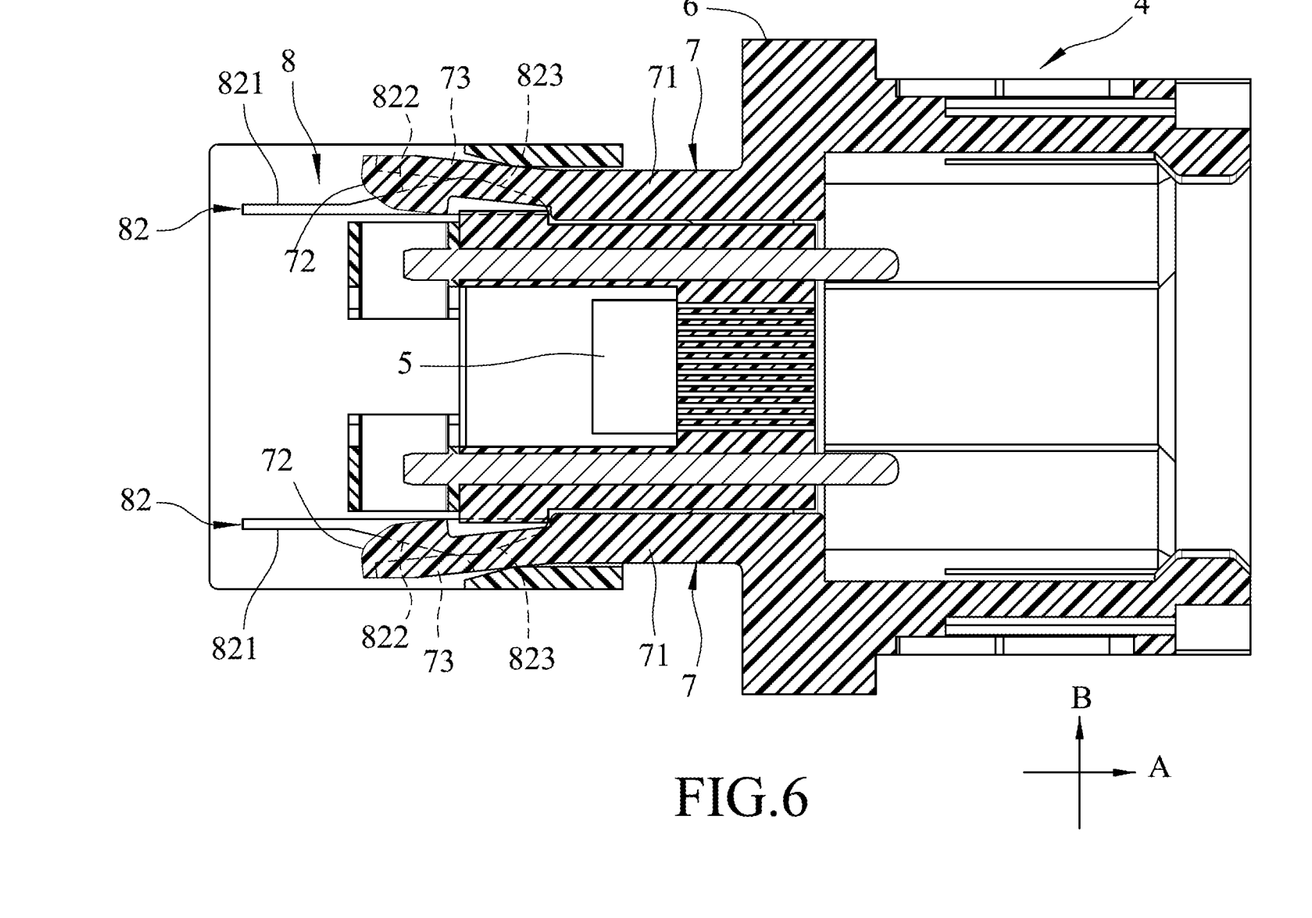
FIG. 6 is a top sectional view of the embodiment, illustrating the auxiliary member in an open position.

Referring to FIGS. 4 to 6, when a user wishes to disengage the ferrule end 5, the user may simply move the auxiliary member 8 rearwardly to the open position (FIG. 6). During this movement, the protruded portions 73 are respectively pushed by the first guiding surfaces 822 of the guiding portions 82 to move away from each other in the first direction (B), driving the extended portions 71 to bent outwardly, and in turn driving the hook portions 72 to move away from each other in the first direction (B) so as to disengage from the ferrule end 5. Specifically, once the auxiliary member 8 is at the opened position, the distance between the hook portions 72 become larger than the width of the ferrule end 5 in the direction (B). It should be noted that since the positioning tongues 64 are still slidably engaged with the guiding grooves 811, the auxiliary member 8 would remain coupled to the outer casing 6. In addition, the presence of the blocking portion 83 of the auxiliary member 8 facilitates co-movement of the ferrule end 5 and the auxiliary member 8 when the auxiliary member 8 moves from the locked position to the open position. Specifically, the blocking portion 83 pushes the ferrule end 5 to move rearwardly when the auxiliary member 8 moves from the locked position to the open position.

On the other hand, to re-couple the ferrule end 5 to the coupling members 7, the ferrule end 5 is initially inserted into the auxiliary member 8 with the auxiliary member 8 being at the open position, and is then registered to a space between the coupling members 7 to be inserted thereinto. The ferrule end 5 pushes the blocking portion 83 of the auxiliary member 8 to move forwardly to the locked position, and drives the positioning tongues 64 to slidably move along respective guiding grooves 811. When the auxiliary member 8 moves from the open position to the locked position, the protruded portions 73 move past the respective first guiding surfaces 822 to be respectively in contact with the positioning surfaces 821, so the coupling members 7 restore to their original state to engage the hook portions 72 with the ferrule end 5. During installation of the auxiliary member 8 to the coupling members 7, the protruded portions 73 of the coupling members 7 slide along respective second guiding surfaces 823 of the guiding portions 82 before sliding along respective first guiding surfaces 822. Before the protruded portions 73 reach respective intersection between corresponding ones of the first and second guiding surfaces 822, 823, the hook portions 72 move away from each other in the second direction (C).

Figure 7:
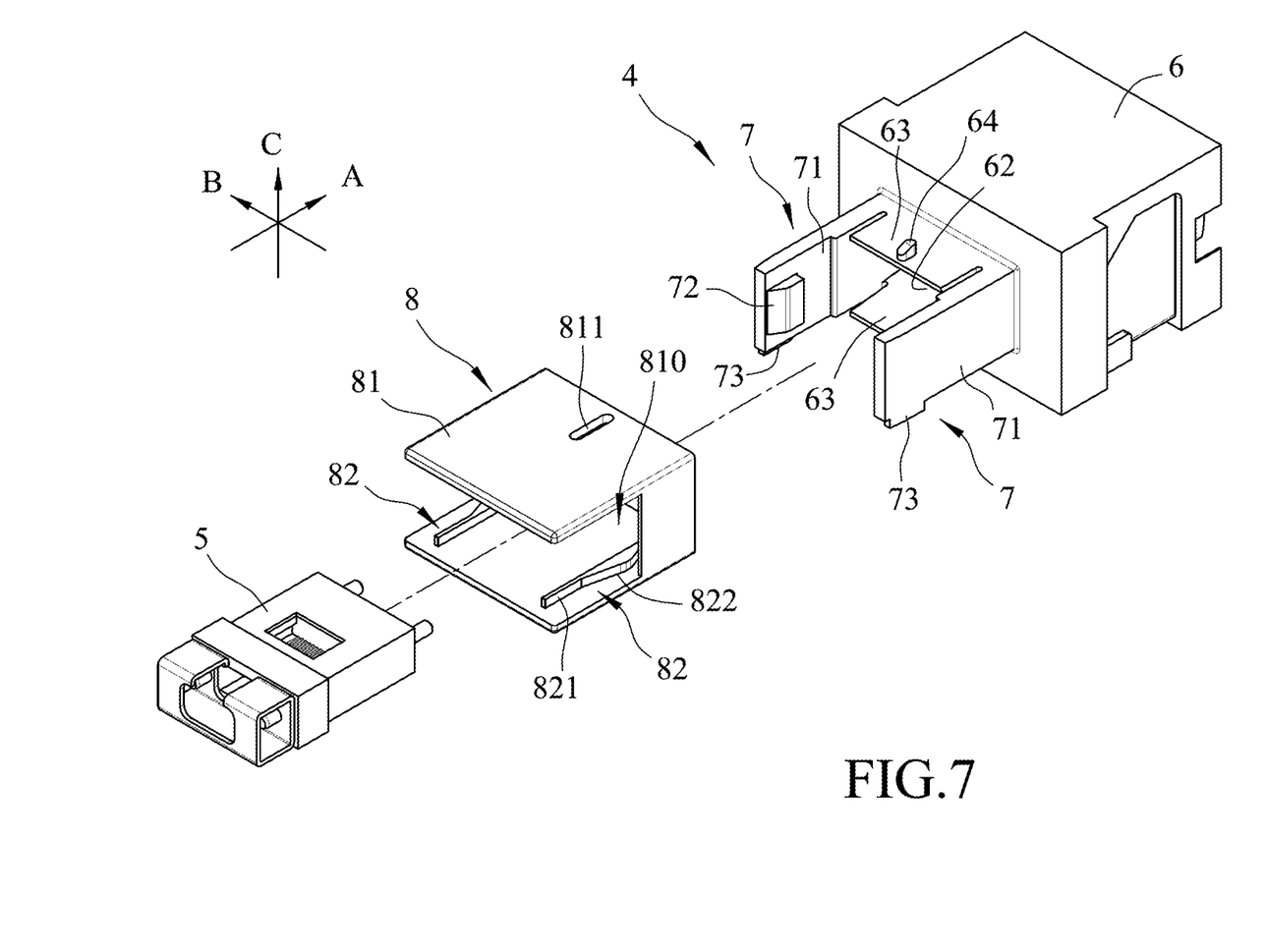
FIG. 7 is an exploded perspective view, illustrating another configuration of the embodiment.

Referring to FIG. 7, another configuration of the fiber optic adapter 4 is similar to that of the first embodiment. In this configuration, the number of the guiding portions 82 of the auxiliary member 8 is two instead of four, and number of the protruded portions 73 of each of the coupling members 7 is only one. This configuration offers the same benefits as the main embodiment while being structurally simpler.

Overall, via the design of the guiding portions 82 of the auxiliary member 8, the protruded portions 73 of the coupling members 7 are operable to be pushed by the guiding portions 82 to move away from each other, thereby driving the hook portions 72 of the coupling members 7 to move away from each other so as to disengage from the ferrule end 5, without using extra tools.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A fiber optic adapter comprising:
an outer casing;
two coupling members that are mounted to said outer casing, that are spaced apart from each other in a first direction (B), and that are adapted for removably engaging a ferrule end of a fiber optic connector; and
an auxiliary member that is adapted for sleeving the ferrule end therein, that is removably coupled to said coupling members, and that is operable to move in a front-rear direction (A) transverse to the first direction (B) relative to said coupling members between a locked position and an open position;
wherein, when said auxiliary member is at the locked position, said coupling members are adapted to engage the ferrule end for preventing separation of the ferrule end from said fiber optic adapter,
wherein, when said auxiliary member is at the open position, it moves said coupling members to disengage from the ferrule end, thereby allowing separation of the ferrule end from said fiber optic adapter,
wherein:
said auxiliary member includes
a sleeving portion that defines an inner space for retaining the ferrule end therein, and
four guiding portions that are disposed in said inner space and that protrude from an inner surface of said sleeving portion;
each of said coupling members includes
an extended portion that extends from said outer casing in the front-rear direction (A),
a hook portion that extends from said extended portion in the first direction (B) toward the other one of said coupling members, and
two protruded portions that protrude away from each other from said extended portion in a second direction (C) transverse to both the first direction (B) and the front-rear direction (A); and
when said auxiliary member moves from the locked position to the open position, said protruded portions of said coupling members are respectively pushed by said guiding portions such that said hook portions move away from each other in the first direction (B) so as to disengage from the ferrule end.

2. The fiber optic adapter as claimed in claim 1, wherein:
each of said guiding portions of said auxiliary member has
a positioning surface that extends in the front-rear direction (A), and
a first guiding surface that extends from said position surface and that is inclined away from a space between said guiding portions and toward said outer casing; and
when said auxiliary member moves from the locked position to the open position, said protruded portions are respectively pushed by said first guiding surfaces of said guiding portions such that said hook portions move away from each other.

3. The fiber optic adapter as claimed in claim 2, wherein:
each of said guiding portions of said auxiliary member further has a second guiding surface that extends from said first guiding surface and that is inclined toward the space between said guiding portions and toward said outer casing.

4. The fiber optic adapter as claimed in claim 1, wherein said auxiliary member further includes a blocking portion that protrudes inwardly from said sleeving portion into said inner space and that is adapted for restricting movement of the ferrule end through said auxiliary member.

5. The fiber optic adapter as claimed in claim 1, wherein:
said sleeving portion of said auxiliary member is formed with two guiding grooves that extend in the front-rear direction (A); and
said outer casing includes two extending walls that are spaced apart from each other in a second direction (C) transverse to both the first direction (B) and the front-rear direction (A) and that are disposed between said coupling members, and two positioning tongues that protrude respectively and outwardly from said extending walls in the second direction (C); and
said positioning tongues respectively extend into said guiding grooves to be slidably engaged therewith.

6. A fiber optic adapter comprising:
an outer casing;
two coupling members that are mounted to said outer casing, that are spaced apart from each other in a first direction (B), and that are adapted for removably engaging a ferrule end of a fiber optic connector; and
an auxiliary member that is adapted for sleeving the ferrule end therein, that is removably coupled to said coupling members, and that is operable to move in a front-rear direction (A) transverse to the first direction (B) relative to said coupling members between a locked position and an open position;
wherein, when said auxiliary member is at the locked position, said coupling members are adapted to engage the ferrule end for preventing separation of the ferrule end from said fiber optic adapter,
wherein, when said auxiliary member is at the open position, it moves said coupling members to disengage from the ferrule end, thereby allowing separation of the ferrule end from said fiber optic adapter,
wherein:
said auxiliary member includes
a sleeving portion that defines an inner space for retaining the ferrule end therein, and
two guiding portions that are disposed in said inner space and that protrude from an inner surface of said sleeving portion; and
when said auxiliary member moves from the locked position to the open position, the coupling members are respectively pushed by said guiding portions to disengage from the ferrule end, thereby allowing said auxiliary member to drive separation of the ferrule end from said fiber optic adapter, and
wherein said auxiliary member further includes a blocking portion that protrudes inwardly from said sleeving portion into said inner space and that is adapted for restricting movement of the ferrule end through said auxiliary member.

7. The fiber optic adapter as claimed in claim 6, wherein:
each of said coupling members includes
an extended portion that extends from said outer casing in the front-rear direction, a hook portion that extends from said extended portion in the first direction (B) toward the other one of said coupling members, and a protruded portion that protrudes from said extended portion in a second direction (C) transverse to both the first direction (B) and the front-rear direction (A); and when said auxiliary member moves from the locked position to the open position, said protruded portions of said coupling members are respectively pushed by said guiding portions to move away from each other, thereby driving said hook portions of said coupling members to move away from each other in the first direction (B) so as to disengage from the ferrule end.

8. The fiber optic adapter as claimed in claim 7, wherein:

each of said guiding portions of said auxiliary member has a positioning surface that extends in the front-rear direction (A), and a first guiding surface that extends from said position surface and that is inclined away from a space between said guiding portions and toward said outer casing; and when said auxiliary member moves from the locked position to the open position, said protruded portions are respectively pushed by said first guiding surfaces of said guiding portions to move away from each other.

9. The fiber optic adapter as claimed in claim 8, wherein:

each of said guiding portions of said auxiliary member further has a second guiding surface that extends from said first guiding surface and that is inclined toward the space between said guiding portions and toward said outer casing.

10. The fiber optic adapter as claimed in claim 6, wherein:

said sleeving portion of said auxiliary member is formed with two guiding grooves that extend in the front-rear direction (A); and said outer casing includes two extending walls that are spaced apart from each other in a second direction (C) transverse to both the first direction (B) and the front-rear direction (A) and that are disposed between said coupling members, and two positioning tongues that protrude respectively and outwardly from said extending walls in the second direction (C); and said positioning tongues respectively extend into said guiding grooves to be slidably engaged therewith.

11. A fiber optic adapter comprising:

an outer casing;

two coupling members that are mounted to said outer casing, that are spaced apart from each other in a first direction (B), and that are adapted for removably engaging a ferrule end of a fiber optic connector; and an auxiliary member that is adapted for sleeving the ferrule end therein, that is removably coupled to said coupling members, and that is operable to move in a front-rear direction (A) transverse to the first direction (B) relative to said coupling members between a locked position and an open position;

wherein, when said auxiliary member is at the locked position, said coupling members are adapted to engage the ferrule end for preventing separation of the ferrule end from said fiber optic adapter, wherein, when said auxiliary member is at the open position, it moves said coupling members to disengage from the ferrule end, thereby allowing separation of the ferrule end from said fiber optic adapter, wherein:

said auxiliary member includes a sleeving portion that defines an inner space for retaining the ferrule end therein, and two guiding portions that are disposed in said inner space and that protrude from an inner surface of said sleeving portion; and when said auxiliary member moves from the locked position to the open position, the coupling members are respectively pushed by said guiding portions to disengage from the ferrule end, thereby allowing said auxiliary member to drive separation of the ferrule end from said fiber optic adapter, and wherein:

said sleeving portion of said auxiliary member is formed with two guiding grooves that extend in the front-rear direction (A); and said outer casing includes two extending walls that are spaced apart from each other in a second direction (C) transverse to both the first direction (B) and the front-rear direction (A) and that are disposed between said coupling members, and two positioning tongues that protrude respectively and outwardly from said extending walls in the second direction (C); and said positioning tongues respectively extend into said guiding grooves to be slidably engaged therewith.

12. The fiber optic adapter as claimed in claim 11, wherein:

each of said coupling members includes an extended portion that extends from said outer casing in the front-rear direction, a hook portion that extends from said extended portion in the first direction (B) toward the other one of said coupling members, and a protruded portion that protrudes from said extended portion in a second direction (C) transverse to both the first direction (B) and the front-rear direction (A); and when said auxiliary member moves from the locked position to the open position, said protruded portions of said coupling members are respectively pushed by said guiding portions to move away from each other, thereby driving said hook portions of said coupling members to move away from each other in the first direction (B) so as to disengage from the ferrule end.

13. The fiber optic adapter as claimed in claim 12, wherein:

each of said guiding portions of said auxiliary member has a positioning surface that extends in the front-rear direction (A), and a first guiding surface that extends from said position surface and that is inclined away from a space between said guiding portions and toward said outer casing; and when said auxiliary member moves from the locked position to the open position, said protruded portions are respectively pushed by said first guiding surfaces of said guiding portions to move away from each other.

14. The fiber optic adapter as claimed in claim 13, wherein:

each of said guiding portions of said auxiliary member further has a second guiding surface that extends from said first guiding surface and that is inclined toward the space between said guiding portions and toward said outer casing.

* * * * *